(12) United States Patent
Miyoshi et al.

(10) Patent No.: US 8,897,251 B2
(45) Date of Patent: Nov. 25, 2014

(54) WIRELESS COMMUNICATION BASE STATION APPARATUS AND PILOT SIGNAL DISPOSING METHOD

(75) Inventors: Kenichi Miyoshi, Kanagawa (JP); Akihiko Nishio, Kanagawa (JP); Yuichi Kobayakawa, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 611 days.

(21) Appl. No.: 12/282,476

(22) PCT Filed: Mar. 15, 2007

(86) PCT No.: PCT/JP2007/055187
§ 371 (c)(1),
(2), (4) Date: Sep. 10, 2008

(87) PCT Pub. No.: WO2007/108392
PCT Pub. Date: Sep. 27, 2007

(65) Prior Publication Data
US 2009/0060077 A1      Mar. 5, 2009

(30) Foreign Application Priority Data
Mar. 17, 2006   (JP) .................................. 2006-075504

(51) Int. Cl.
```
H04W 4/00      (2009.01)
H04J 4/00      (2006.01)
H04B 3/10      (2006.01)
H04W 72/00     (2009.01)
H04L 5/00      (2006.01)
```
(52) U.S. Cl.
CPC .............. *H04L 5/005* (2013.01); *H04L 5/0051* (2013.01); *H04L 5/0007* (2013.01)
USPC ........... 370/330; 370/436; 370/478; 370/482; 370/491; 455/451; 455/509; 455/522; 455/561

(58) Field of Classification Search
USPC .......... 370/330, 436, 478, 482, 491; 455/451, 455/509, 522, 561
See application file for complete search history.

(56) References Cited

U.S. PATENT DOCUMENTS 6,768,713 B1 *   7/2004   Siala et al. ..................... 370/203
7,248,559 B2 *   7/2007   Ma et al. ........................ 370/208
(Continued)

FOREIGN PATENT DOCUMENTS

EP     1 760 907     3/2007
EP     1 775 901     4/2007
(Continued)

OTHER PUBLICATIONS

International Search Report dated Apr. 17, 2007.
(Continued)

*Primary Examiner* — Alpus H Hsu
*Assistant Examiner* — Walter Divito
(74) *Attorney, Agent, or Firm* — Dickinson Wright PLLC (57) ABSTRACT

A base station device is provided with features in which multicast data can be prevented from deterioration in the accuracy of channel estimation due to interference of a unicast data pilot signal when multicast data and unicast data are multiplexed for transmission. In this device, a unicast pilot signal generating unit (105-1) generates a unicast data pilot signal, a multicast pilot signal generating unit (105-2) generates a multicast data pilot signal, a disposing unit (106) disposes a unicast data symbol, a multicast data symbol, the unicast data pilot signal, and the multicast pilot signal at either position on a two-dimensional plane comprised of a frequency axis and a time axis to output them to an IFFT unit (107). In this case, the disposing unit (106) disposes the multicast data pilot signal at a position on the two-dimensional plane comprised of the frequency axis and the time axis where the unicast data pilot signal does not interfere with it.

10 Claims, 12 Drawing Sheets

(56) References Cited

U.S. PATENT DOCUMENTS

| | | | |
|---|---|---|---|
| 7,342,974 B2* | 3/2008 | Chiou | 375/260 |
| 7,782,757 B2* | 8/2010 | Wang et al. | 370/208 |
| 2001/0007819 A1* | 7/2001 | Kubota | 455/439 |
| 2002/0003774 A1* | 1/2002 | Wang et al. | 370/208 |
| 2002/0150037 A1* | 10/2002 | Bao et al. | 370/208 |
| 2003/0016621 A1* | 1/2003 | Li | 370/203 |
| 2004/0082356 A1 | 4/2004 | Walton | |
| 2004/0184399 A1* | 9/2004 | Chiou | 370/206 |
| 2004/0192201 A1 | 9/2004 | Febvre | |
| 2005/0195734 A1* | 9/2005 | Sandell et al. | 370/208 |
| 2005/0213680 A1* | 9/2005 | Atungsiri et al. | 375/260 |
| 2006/0088133 A1* | 4/2006 | Chen et al. | 375/343 |
| 2007/0036066 A1* | 2/2007 | Thomas et al. | 370/208 |
| 2007/0071127 A1* | 3/2007 | Gore et al. | 375/267 |
| 2007/0217546 A1* | 9/2007 | Sandell et al. | 375/299 |
| 2008/0298275 A1* | 12/2008 | De Sousa | 370/255 |
| 2009/0004971 A1* | 1/2009 | Dateki et al. | 455/62 |
| 2009/0316614 A1* | 12/2009 | Kim et al. | 370/312 |
| 2009/0316817 A1* | 12/2009 | Li | 375/260 |
| 2010/0202544 A1* | 8/2010 | Osseirar et al. | 375/260 |

FOREIGN PATENT DOCUMENTS

| | | |
|---|---|---|
| EP | 1 881 628 | 1/2008 |
| JP | 2000-269876 | 9/2000 |
| JP | 2003-174426 | 6/2003 |
| JP | 2003-244094 | 8/2003 |
| JP | 2004-350242 | 12/2004 |
| JP | 2006-211284 | 8/2006 |
| JP | 2006-287895 | 10/2006 |
| JP | 2006-311359 | 11/2006 |
| WO | 2004/039011 | 5/2004 |
| WO | 2005/060298 | 6/2005 |
| WO | 2006/011347 | 2/2006 |

OTHER PUBLICATIONS

3GPP TSG RAN WG1 LTE Ad Hoc Meeting (Jun. 2005) R1-050589 "Pilot channel and scrambling code in evolved UTRA downlink," Jun. 20-21, 2005, pp. 1-24.

3GPP TSG RAN WG1 LTE Ad Hoc Meeting (Jan. 2006) R1-060182 "MBMS Structure for Evolved UTRA," Jan. 23-25, 2006, 6 pages total.

Japanese Notice of Reasons for Rejection dated Sep. 13, 2011.

3GPP TSG-RAN WG1 Meeting #44, "Investigations on Pilot Channel Structure for MBMS in E-UTRA Downlink," NTT DoCoMo, et al., R1-060434, Feb. 13-17, 2006, pp. 1-9.

Supplementary European Search Report dated Mar. 14, 2012.

TSG-RAN WG1 LTE Ad hoc meeting, "Unicast/muiticast multiplexing for downlink OFDM," Panasonic, R1-060158, XP050417516, Jan. 23-25, 2006, pp. 1-4.

* cited by examiner

WIRELESS COMMUNICATION BASE STATION APPARATUS AND PILOT SIGNAL DISPOSING METHOD

TECHNICAL FIELD

The present invention relates to a radio communication base station apparatus and a pilot mapping method.

BACKGROUND ART

In recent years, in mobile communication, various kinds of information such as images and data as well as speech are subjected to transmission. Following this trend, it is expected that demands further increase for high reliability and high speed transmission. However, when high speed transmission is performed in mobile communication, the influence of delayed waves by multipath is not negligible, and transmission performance degrades due to frequency selective fading.

Multicarrier communication such as the OFDM (Orthogonal Frequency Division Multiplexing) scheme has attracted attention as one of counter techniques for frequency selective fading. In multicarrier communication, data is transmitted using a plurality of subcarriers of transmission rates suppressed to such an extent that frequency selective fading does not occur. Particularly, with the OFDM scheme, the frequencies of a plurality of subcarriers where data is mapped are orthogonal to each other, so that the OFDM scheme has the highest frequency efficiency in multicarrier communication and implements multicarrier communication with relatively simple hardware configurations. Therefore, the OFDM scheme has attracted attention as a communication method to be employed in cellular scheme mobile communication, and has been studied in various ways. Further, according to the OFDM scheme, to prevent intersymbol interference (ISI), the tail end of each OFDM symbol is attached to the head of that OFDM symbol as a CP (Cyclic Prefix). By this means, on the receiving side, it is possible to prevent ISI as long as the delay time of delay waves stays within the time length of a CP (hereinafter "CP length").

By the way, recently, studies on multicast communication are underway. Multicast communication is not one-to-one communication such as unicast communication, but is one-to-many communication. That is, in multicast communication, one radio communication base station apparatus (hereinafter simply "base station") transmits the same data to a plurality of radio communication mobile station apparatuses (hereinafter simply "mobile stations") at the same time. By this multicast communication, in the mobile communication system, for example, distribution services of music data and video image data and broadcast services such as television broadcast are realized. Further, services using multicast communication may have to be provided in a relatively wide communication area which cannot be covered by a single base station, and, in this case, multicast communication covers the entirety of the wide communication area by transmitting the same data from a plurality of base stations. That is, multicast data is the same between a plurality of cells. Thus, in multicast communication, the same multicast data is transmitted from a plurality of base stations at the same time, and, consequently, a mobile station nearby the cell boundary receives mixed multicast data comprised of multicast data from a plurality of base stations.

Here, in a mobile station located nearby the cell boundary, if the OFDM scheme is employed in multicast communication, when a plurality of the same OFDM symbols transmitted at the same time from a plurality of base stations are received within the CP length, these OFDM symbols are combined and received in a state their received power is amplified. To correct the channel fluctuation (phase fluctuation and amplitude fluctuation) of the combined signals by channel estimation, channel estimation values for these combined signals are necessary. Therefore, in multicast communication using the OFDM scheme, for a pilot used to calculate channel estimation values, the same pilot needs to be transmitted from a plurality of base stations at the same time, as in the case of multicast data. That is, multicast data pilots need to be common between a plurality of cells.

On the other hand, in unicast communication, a plurality of base stations transmit respective data (unicast data) (see Non-Patent Document 1). That is, unicast data differs between multiple cells. Here, unicast data refers to, for example, control data needed to transmit user data from a mobile station. By this means, for the pilot used to calculate channel estimation values in unicast communication, different pilots need to be transmitted from a plurality of base stations as in the case of unicast data. That is, unicast data pilots need to be different between multiple cells.

Further, studies are underway on the method of mapping pilots upon multiplexing and transmitting multicast data and unicast data (see Non-Patent Document 2). Further, while multicast communication employs a mode of communication in which information is transmitted only to specific mobile stations subscribing services such as news groups, broadcast communication employs a mode of communication in which information is transmitted to all mobile stations as in today's television broadcast and radio broadcast. However, the multicast communication is the same as the broadcast communication in that one base station transmits the same data to a plurality of mobile stations at the same time. Therefore, this document describes an MBMS (Multimedia Broadcast/Multicast Service) combining multicast and broadcast. Further, in this document, broadcast is used for explanation instead of multicast.

Non-Patent Document 1: 3GPP TSG RAN WG1 LTE Ad Hoc Meeting (2005.06) R1-050589 "Pilot channel and scrambling code in evolved UTRA downlink"

Non-Patent Document 2: 3GPP TSG RAN WG1 LTE Ad Hoc Meeting (2006.01) R1-060182 "MBMS Structure for Evolved UTRA"

DISCLOSURE OF INVENTION

Problem to be Solved by the Invention

However, unicast data pilots differ between multiple cells, and therefore are transmitted with relatively high power to reduce interference of unicast data pilots between cells.

On the other hand, as described above, multicast data pilots are common between multiple cells, so that multicast data pilots do not interfere with each other between cells. Therefore, multicast data pilots are transmitted with relatively low power.

Depending on the mapping of these pilots, unicast data pilots may interfere with multicast data pilots and consequently degrades the accuracy of channel estimation for multicast data performed using multicast data pilots.

It is therefore an object of the present invention to provide a base station and pilot mapping method for preventing degradation of accuracy in channel estimation for multicast data due to interference from unicast data pilots.

Means for Solving the Problem

The base station of the present invention that multiplexes in the time domain and transmits a first multicarrier signal and a second multicarrier signal, the first multicarrier signal and the second multicarrier signal being respectively comprised of first data (unicast data) that varies between a plurality of cells and second data (multicast data) that is the same between the plurality of cells, employs a configuration having: a generating section that generates a first pilot for the first data (unicast data pilot) and a second pilot for the second data (multicast data pilot); and a mapping section that maps the second pilot (multicast data pilot) in a position where in which the first pilot (unicast data pilot) does not interfere with the second pilot in a two-dimensional plane representing comprised of a frequency domain and a time domain.

Further, the pilot mapping method of the present invention in a radio communication base station apparatus that multiplexes in the time domain and transmits a first multicarrier signal and a second multicarrier signal, the first multicarrier signal and the second multicarrier signal being respectively comprised of first data (unicast data) that varies between a plurality of cells and second data (multicast data) that is the same between the plurality of cells, employs a method including mapping the second pilot (multicast data pilot) in a position where the first pilot (unicast data pilot) does not interfere with the second pilot (multicast data pilot) a two-dimensional plane representing a frequency domain and a time domain.

Advantageous Effect of the Invention

According to the present invention, it is possible to prevent degradation of accuracy in channel estimation for second data (multicast data) due to interference from first data pilots (unicast data pilots).

BEST MODE FOR CARRYING OUT THE INVENTION

Embodiments of the present invention will be explained below in detail with reference to the accompanying drawings. Further, although a case will be explained with the following explanation where the OFDM scheme is used as an example of a multicarrier communication scheme, the present invention is not limited to the OFDM scheme.

(Embodiment 1)

The base station according to the present embodiment that is used in a mobile communication system of the OFDM scheme, and time-domain-multiplexes an OFDM symbol in which unicast data is mapped on a plurality of subcarriers and an OFDM symbol in which multicast data is mapped on a plurality of subcarriers, and transmits the result to a mobile station.

Figure 1:
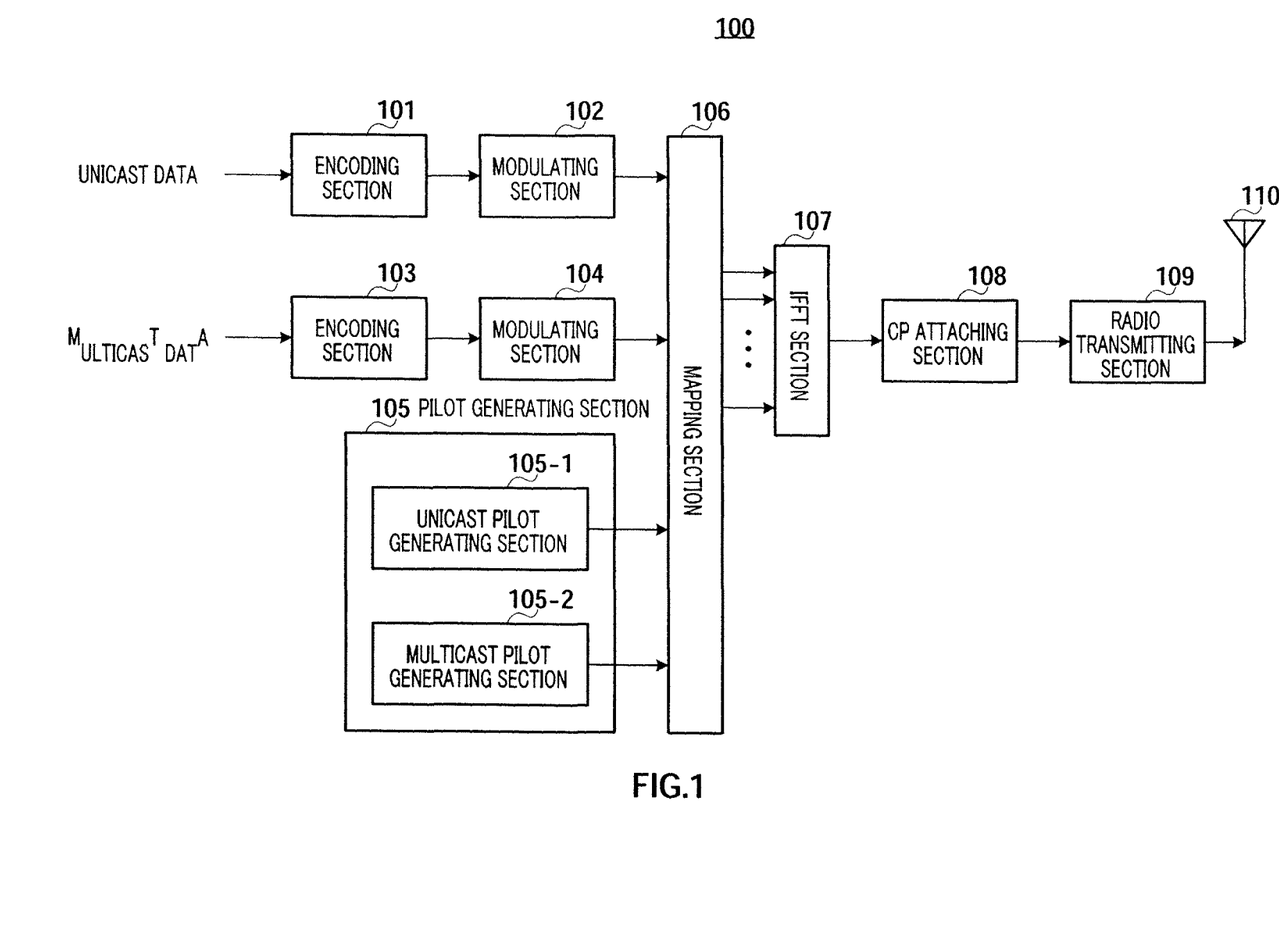
FIG. 1 is a block diagram showing a configuration of a base station according to Embodiment 1 of the present invention.

FIG. 1 illustrates a configuration of base station 100 according to the present embodiment.

Encoding section 101 encodes unicast data and outputs the result to modulating section 102.

Modulating section 102 generates unicast data symbols by modulating the encoded unicast data and outputs the unicast data symbols to mapping section 106.

Encoding section 103 encodes multicast data and outputs the result to modulating section 104.

Modulating section 104 generates multicast data symbols by modulating the encoded multicast data and outputs the result to mapping section 106.

Pilot generating section 105 is configured with unicast pilot generating section 105-1 and multicast pilot generating section 105-2.

Unicast pilot generating section 105-1 generates unicast data pilots and outputs these pilots to mapping section 106.

Multicast pilot generating section 105-2 generates multicast data pilots and outputs these pilots to mapping section 106.

Mapping section 106 maps the unicast data symbols, the multicast data symbols, the unicast data pilots and the multicast data pilots in arbitrary positions in a two-dimensional plane comprised of the frequency domain and the time domain, and outputs the result to IFFT (Inverse Fast Fourier Transform) section 107. The frequency domain is associated with a plurality of subcarriers forming an OFDM symbol, and the time domain is associated with a plurality of OFDM symbols transmitted in order. That is, mapping section 106 maps the unicast data symbols, the multicast data symbols, the unicast data pilots and the multicast data pilots in arbitrary positions of a plurality of subcarriers in a plurality of OFDM symbols. In this case, mapping section 106 maps unicast data symbols and multicast data symbols on different subcarriers of OFDM symbols, thereby time-domain-multiplexing the unicast data symbols and the multicast data symbols. Mapping processing will be described later in detail.

By performing an IFFT for a plurality of subcarriers on which unicast data symbols, multicast data symbols, unicast data pilots and multicast data pilots are mapped, IFFT section 107 acquires a time domain signals, that is, generates OFDM symbols that are a multicarrier signals. After the processing in mapping section 106, IFFT section 107 generates an OFDM symbol in which unicast data symbols and unicast data pilots are frequency-domain-multiplexed, an OFDM symbol in which multicast data symbols and multicast data pilots are frequency-domain-multiplexed, an OFDM symbol in which multicast data symbols and unicast data pilots are frequency-domain-multiplexed and an OFDM symbol comprised of only multicast data symbols. Further, these OFDM symbols are time-domain-multiplexed by the processing in mapping section 106 and outputted to CP attaching section 108.

CP attaching section 108 attaches the same symbol as the tail end of each OFDM symbol to the head of that OFDM symbol as a CP.

Radio transmitting section 109 performs transmitting processing such as D/A conversion, amplification and up-conversion on the OFDM symbols with CPs, and transmits the results from antenna 110 to a mobile station.

Next, mapping processing in mapping section 106 will be explained in detail. In a two-dimensional plane representing the frequency domain and the time domain, mapping section 106 maps multicast data pilots in positions where the unicast data pilots do not interfere with the multicast data pilots. Mapping examples 1 to 5 will be explained below. An example will be explained in the following explanations where one OFDM symbol is comprised of nineteen subcarriers $f_1$ to $f_{19}$. Further, an example will be explained where one subframe is comprised of eight OFDM symbols #1 to #8. Further, in the following explanations, an OFDM symbol comprised of unicast data symbols (u) is referred to as a "unicast OFDM symbol" and an OFDM symbol comprised of multicast data symbols (m) is referred to as a "multicast OFDM symbol."

Figure 2:
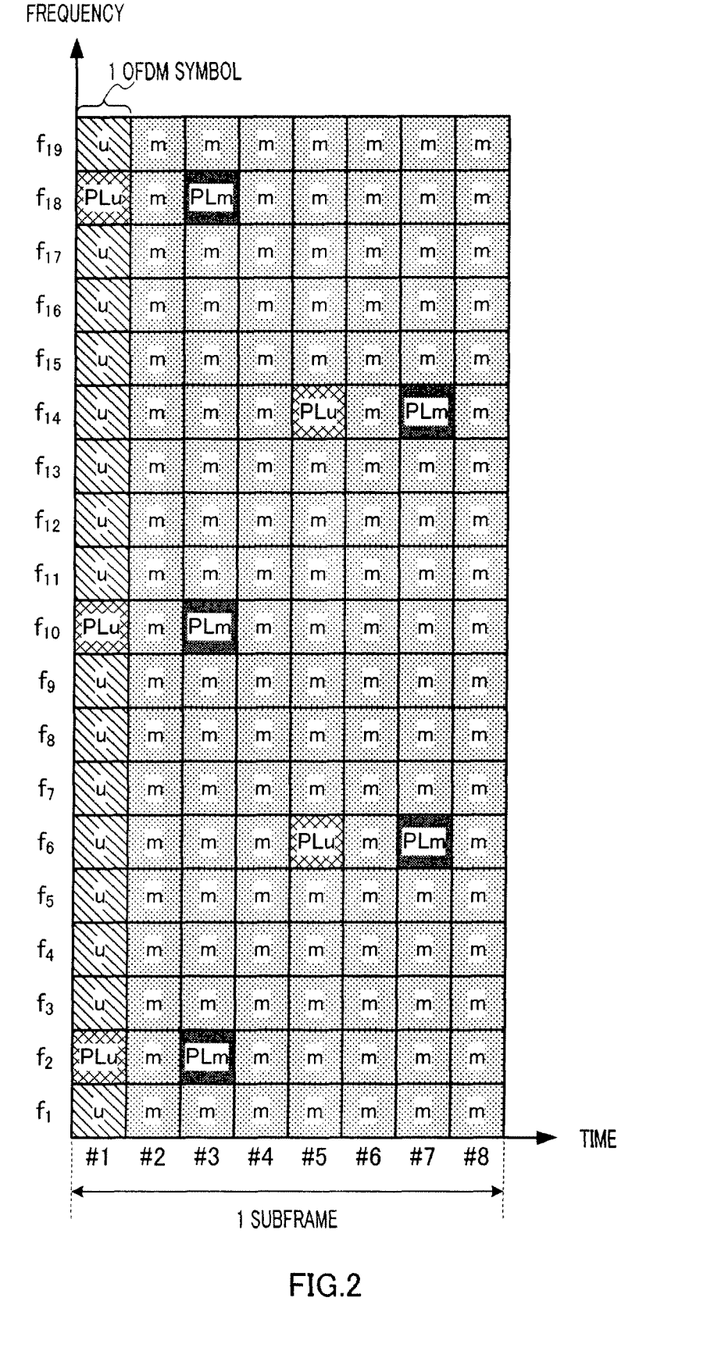
FIG. 2 illustrates a mapping example 1.

MAPPING EXAMPLE 1 FIG. 2

In the present mapping example, unicast data pilots are mapped in arbitrary positions of a plurality of subcarriers forming a unicast OFDM symbol, and multicast data pilots are mapped in arbitrary positions of a plurality of subcarriers forming a multicast OFDM symbol that is not adjacent to that unicast OFDM symbol in the time domain.

Further, in the present mapping example, out of a plurality of subcarriers forming a multicast OFDM symbol, multicast data pilots may be preferably mapped on the subcarriers in the same frequencies as subcarriers on which unicast data pilots are mapped in the unicast OFDM symbol.

To be more specific, as shown in FIG. 2, when unicast data pilots ($PL_u$) are mapped on subcarriers $f_2$, $f_{10}$ and $f_{18}$ in unicast OFDM symbol #1, it may be preferable to map multicast data pilots ($PL_m$) on subcarriers $f_2$, $f_{10}$ and $f_{18}$ of multicast OFDM symbol #3 that is not adjacent to unicast OFDM symbol #1.

Thus, in the time domain, by mapping multicast data pilots in positions one OFDM symbol or more apart from the unicast data pilots, it is possible to map multicast data pilots in positions where the unicast data pilots do not interfere with the multicast data pilots. Therefore, it is possible to prevent degradation of channel estimation accuracy for multicast data due to interference by unicast data pilots.

Further, mapping unicast data pilots and multicast data pilots on subcarriers in the same frequencies, in channel estimation for multicast data using multicast data pilots, it is possible to use a channel estimation value acquired from unicast data pilots as a reference. Therefore, the present mapping example is especially useful in a case where the received power of multicast data pilots in a mobile station is low due to a large cell radius and channel estimation with sufficient accuracy is not possible with multicast data pilots alone.

Further, in a case where unicast data pilots ($PL_u$) are mapped on subcarriers $f_6$ and $f_{14}$ in multicast OFDM symbol #5 as shown in FIG. 2 in order to increase channel estimation accuracy for unicast data, it is preferable to map multicast data pilots ($PL_m$) on subcarriers $f_6$ and $f_{14}$ in multicast OFDM symbol #7 that is not adjacent to multicast OFDM symbol #5.

Figure 3:
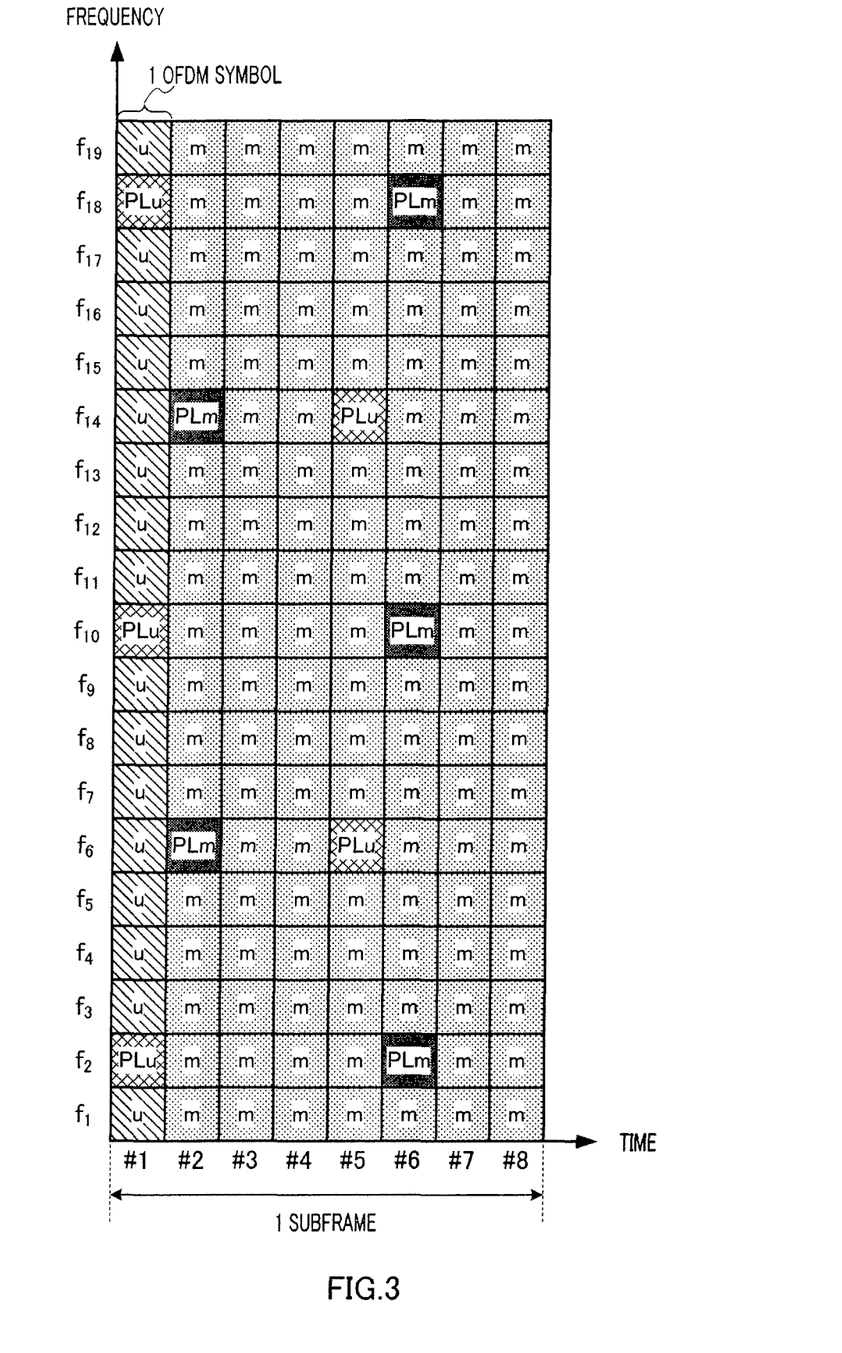
FIG. 3 illustrates a mapping example 2.

MAPPING EXAMPLE 2 FIG. 3

In the present example, unicast data pilots are mapped in arbitrary positions of a plurality of subcarriers forming a unicast OFDM symbol, and, out of a plurality of subcarriers forming a multicast OFDM symbol, multicast data pilots are mapped on subcarriers in different frequencies from the subcarriers on which the unicast data pilots are mapped in the unicast OFDM symbol.

Further, in the present mapping example, it may be preferable to map multicast data pilots on subcarriers in the multicast OFDM symbol that is adjacent in the time domain to the unicast OFDM symbol including unicast data pilots.

To be more specific, as shown in FIG. 3, in a case where unicast data pilots ($PL_u$) are mapped on subcarriers $f_2$, $f_{10}$ and $f_{18}$ in unicast OFDM symbol #1, it is preferable to map multicast data pilots ($PL_m$) on subcarriers $f_6$ and $f_{14}$ in multicast OFDM symbol #2 that is adjacent to unicast OFDM symbol #1.

Thus, in the frequency domain, by mapping multicast data pilots on subcarriers in different frequencies from subcarriers on which unicast data pilots are mapped, it is possible to map multicast data pilots in positions where the unicast data pilots do not interfere with the multicast data pilots. Therefore, it is possible to prevent degradation of accuracy in channel estimation for multicast data due to interference from unicast data pilots.

Further, by mapping unicast data pilots and multicast data pilots on subcarriers in OFDM symbols that are adjacent in the time domain, in a mobile station, the unicast data pilots and the multicast data pilots can be received within a period of two symbols, so that it is possible to reduce the time required to receive pilots, and, as a result, reduce power consumption related to receive pilots.

Further, in a case where unicast data pilots ($PL_u$) are mapped on subcarriers $f_6$ and $f_{14}$ in multicast OFDM symbol #5 as shown in FIG. 3 in order to increase channel estimation accuracy for unicast data, it is preferable to map multicast data pilots ($PL_m$) on subcarriers $f_2$, $f_{10}$ and $f_{18}$ in multicast OFDM symbol #6 that is adjacent to multicast OFDM symbol #5.

Figure 4:
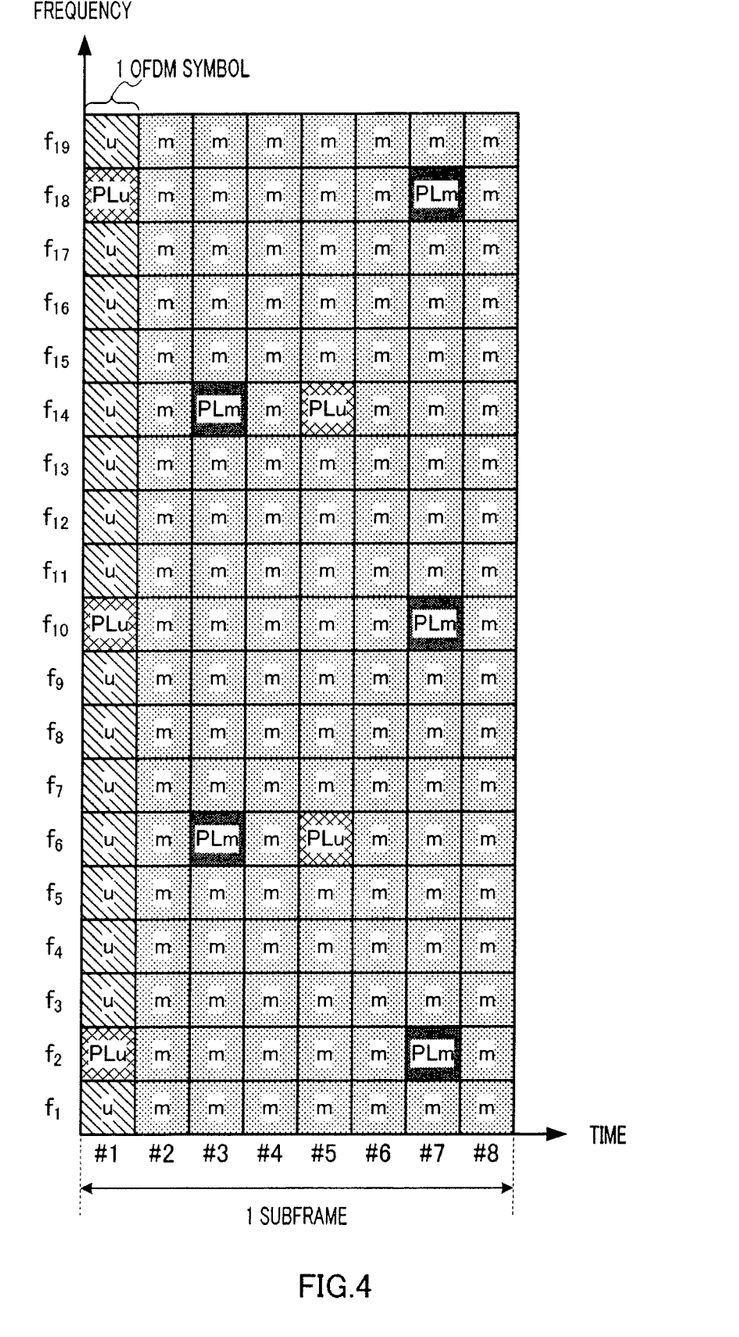
FIG. 4 illustrates a mapping example 3.

MAPPING EXAMPLE 3 FIG. 4

The present setting example is a combination of mapping example 1 and mapping example 2. That is, in the present setting example, unicast data pilots are mapped in arbitrary positions of a plurality of subcarriers forming a unicast OFDM symbol, and, out of a plurality of subcarriers forming a multicast OFDM symbol that is not adjacent to the unicast OFDM symbol in the time domain, multicast data pilots are mapped on subcarriers in different frequencies from subcarriers on which the unicast data pilots are mapped.

To be more specific, as shown in FIG. 4, in a case where unicast data pilots ($PL_u$) are mapped on subcarriers $f_2$, $f_{10}$ and $f_{18}$ in unicast OFDM symbol #1, multicast data pilots ($PL_m$) are mapped on subcarriers $f_6$ and $f_{14}$ in multicast OFDM symbol #3 that is not adjacent to unicast OFDM symbol #1.

Thus, in the time domain and the frequency domain, by mapping multicast data pilots in positions apart from unicast data pilots, it is possible to map the multicast data pilots in positions where the unicast data pilots do not interfere with the multicast data pilots.

Further, in a case where unicast data pilots ($PL_u$) are also mapped on subcarriers $f_6$ and $f_{14}$ in multicast OFDM symbol #5 as shown in FIG. 4 in order to improve the accuracy of channel estimation for unicast data, multicast data pilots ($PL_m$) are mapped on subcarriers $f_2$, $f_{10}$ and $f_{18}$ in multicast data symbol #7 that is not adjacent to multicast OFDM symbol #5.

Figure 5A:
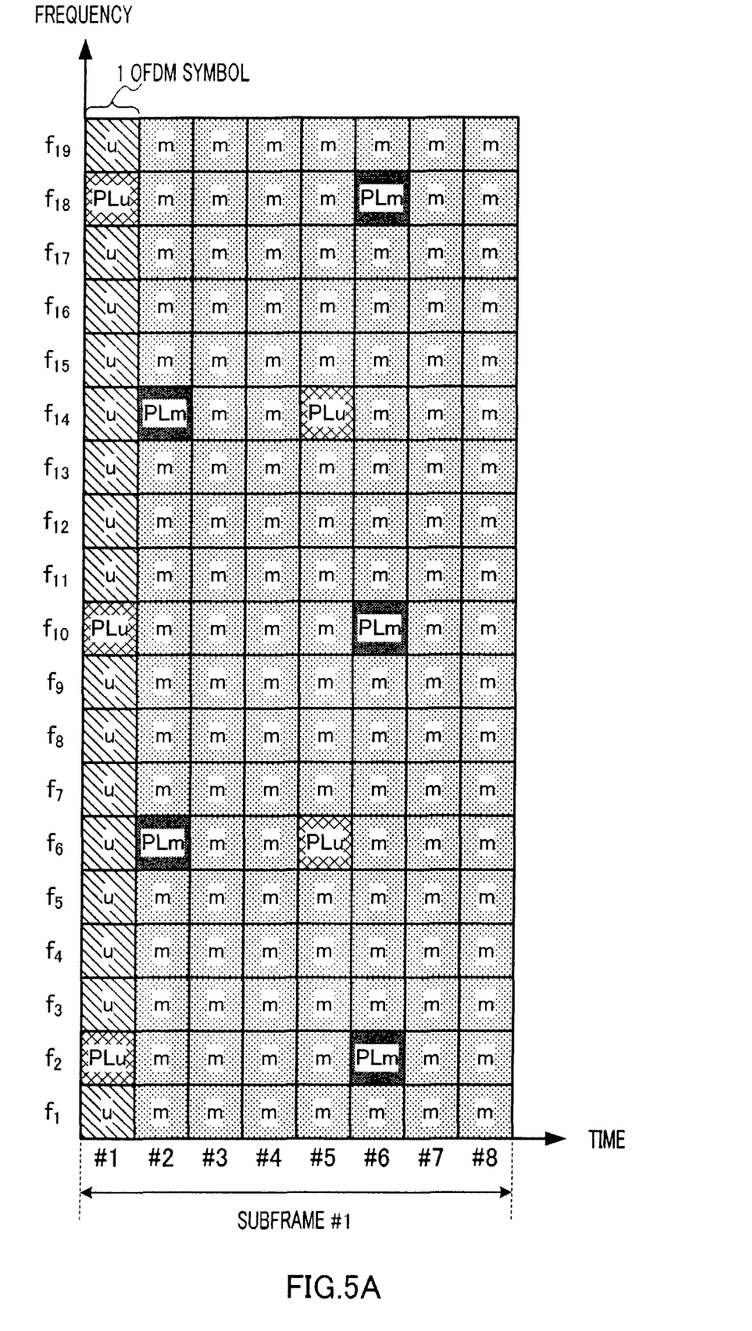
FIG. 5A illustrates a mapping example 4 (cell #1)
Figure 5B:
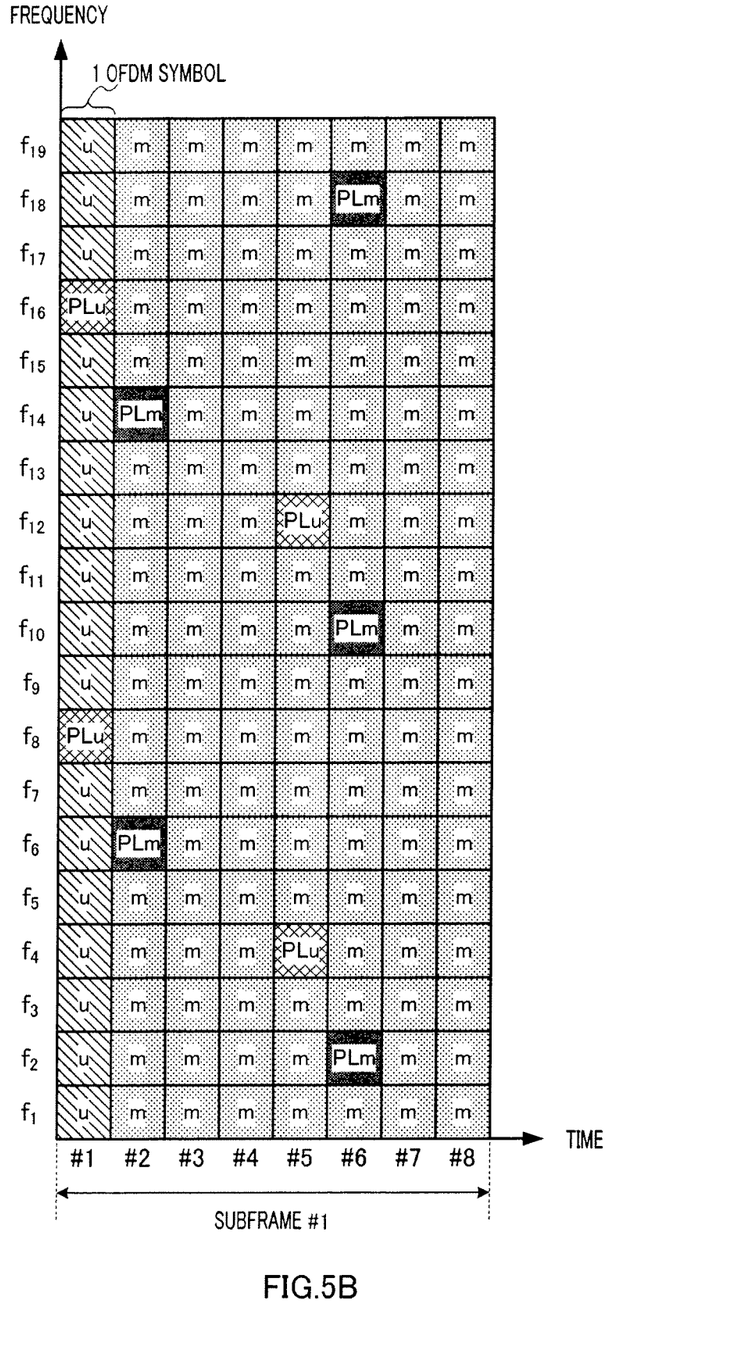
FIG. 5B illustrates a mapping example 4 (cell #2)
Figure 5C:
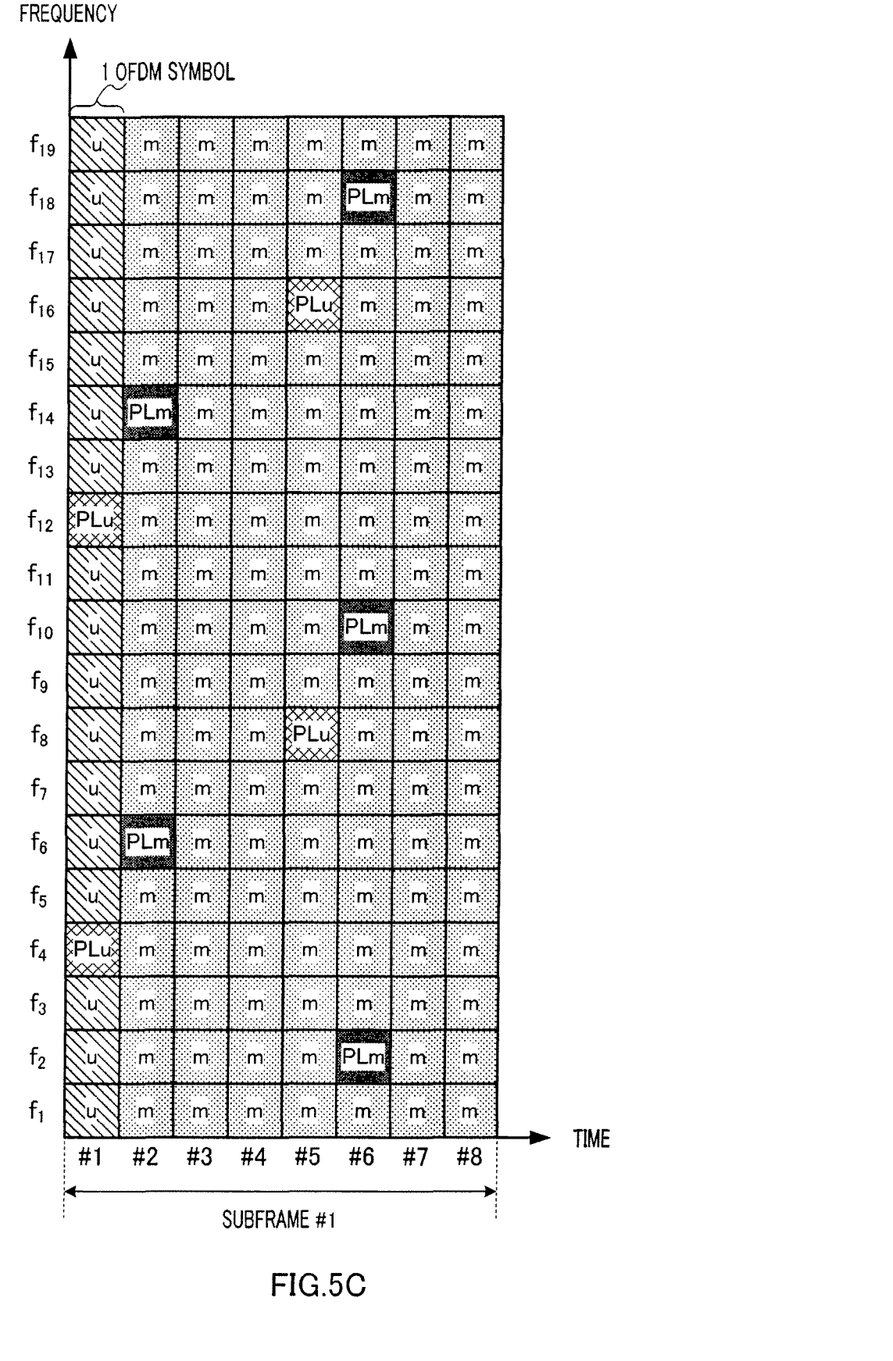
FIG. 5C illustrates a mapping example 4 (cell #3)

MAPPING EXAMPLE 4 FIG. 5 to FIG. 5C

In the present mapping pattern, out of a plurality of subcarriers forming a multicast OFDM symbol, multicast data pilots are mapped on subcarriers in the same frequencies as subcarriers on which multicast data pilots are mapped in another base station for an adjacent cell, and, out of a plurality of subcarriers forming a unicast OFDM symbol, unicast data pilots are mapped on subcarriers in different frequencies from subcarriers on which multicast data pilots are mapped in the multicast OFDM symbol.

FIG. 5A illustrates a mapping example at a base station of cell #1, and FIGS. 5B and 5C illustrate mapping examples at other base stations of cell #2 and cell #3, respectively. Here, a case will be assumed and explained where base station 100 (FIG. 1) is the base station of cell #1.

In the present setting examples, assume that the mapping positions for multicast data pilots are the same in the same subframes between a plurality of base stations of adjacent cells. For example, as shown in FIGS. 5A to 5C, in subframe #1, base stations of cells #1 to #3 map multicast data pilots ($PL_m$) on subcarriers $f_6$ and $f_{14}$ in multicast OFDM symbol #2. That is, out of a plurality of subcarriers $f_1$ to $f_{19}$ forming a multicast OFDM symbol, the base station of cell #1 (FIG. 5A) maps multicast data pilots ($PL_m$) on subcarriers $f_6$ and $f_{14}$ that are the same frequencies as subcarriers $f_6$ and $f_{14}$ on which multicast data pilots are mapped in other base stations of cells #2 and #3 (FIGS. 5B and 5C).

Further, in a case where multicast data pilots ($PL_m$) are mapped as described above, as shown in FIG. 5A, out of a plurality of subcarriers $f_1$ to $f_{19}$ forming unicast OFDM symbol #1, the base station of cell #1 maps unicast data pilots ($PL_u$) on subcarriers $f_2$, $f_{10}$ and $f_{18}$ in different frequencies from subcarriers $f_6$ and $f_{14}$ on which multicast data pilots are mapped in multicarrier OFDM symbol #2. The same applies to the base stations of cell #2 and cell #3 (FIGS. 5B and 5C).

As described above, when multicast data pilots are mapped in the same positions between a plurality of base stations of adjacent cells, each base station maps unicast data pilots on subcarriers in different frequencies from the subcarriers on which multicast data pilots are mapped, so that it is possible to prevent multicast data pilots from interference from unicast data pilots.

Further, by adopting this mapping in adjacent cells, it is possible to prevent multicast data pilots from interference by the unicast data pilots of other cells between these cells.

Therefore, in all of a plurality of adjacent cells, it is possible to prevent degradation of accuracy in channel estimation due to interference from unicast data pilots.

Further, in FIGS. 5A to 5C, to prevent interference from unicast data pilots ($PL_u$) between cells, out of a plurality of subcarriers $f_1$ to $f_{19}$ forming unicast OFDM symbol #1, subcarriers on which unicast data pilots ($PL_u$) are mapped are different between cells. To be more specific, when the base station of cell #1 maps unicast data pilots ($PL_u$) on subcarriers $f_2$, $f_{10}$ and $f_{18}$ in unicast OFDM symbol #1 (FIG. 5A), the base station of cell #2 maps unicast data pilots ($PL_u$) on subcarriers $f_8$ and $f_{16}$ in unicast OFDM symbol #1 (FIG. 5B) and the base station of cell #3 maps unicast data pilots ($PL_u$) on subcarriers $f_4$ and $f_{12}$ in unicast OFDM symbol #1 (FIG. 5C).

Further, for example, as shown in FIGS. 5A to 5C, in a case where multicast data pilots ($PL_m$) are mapped on subcarriers $f_2$, $f_{10}$ and $f_{18}$ in multicast OFDM symbol #6, to enhance channel estimation accuracy for unicast data, the base station of cell #1 may map unicast data pilots ($PL_u$) on subcarriers $f_6$ and $f_{14}$ in multicast OFDM symbol #5 (FIG. 5A). The base stations of cell #2 and #3 perform the same processing as above (FIGS. 5B and 5C).

Figure 6A:
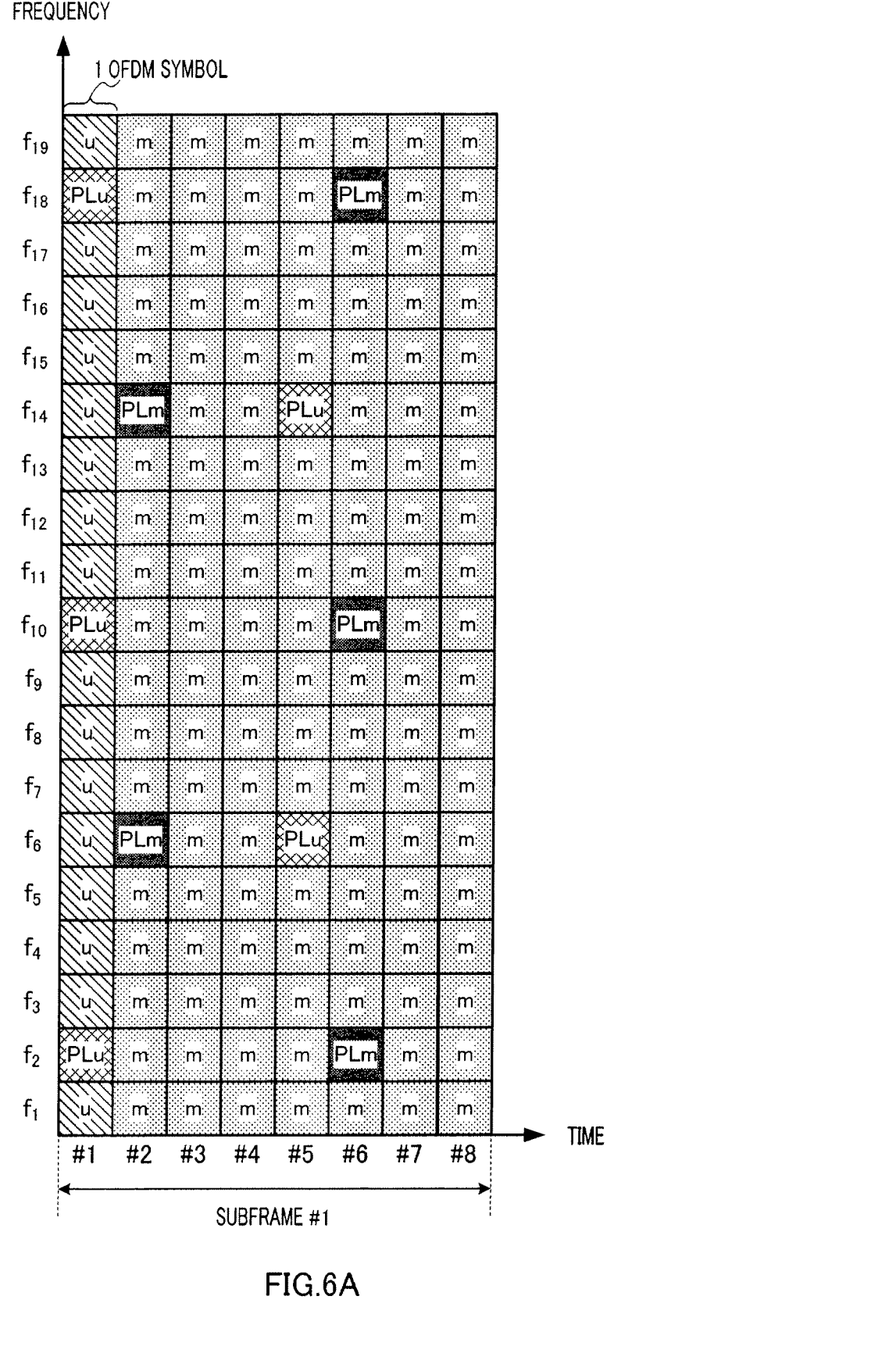
FIG. 6A illustrates a mapping example 5 (subframe #1)
Figure 6B:
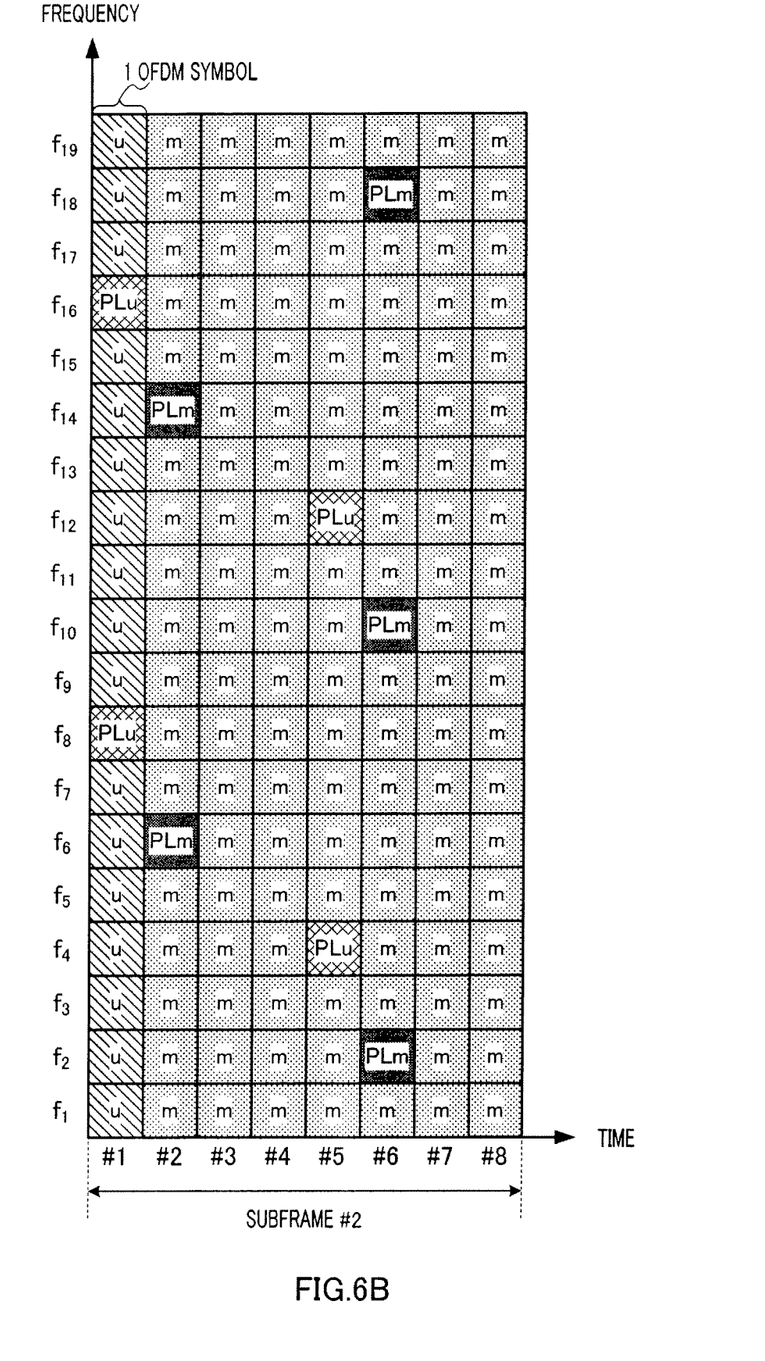
FIG. 6B illustrates a mapping example 5 (subframe #2)
Figure 6C:
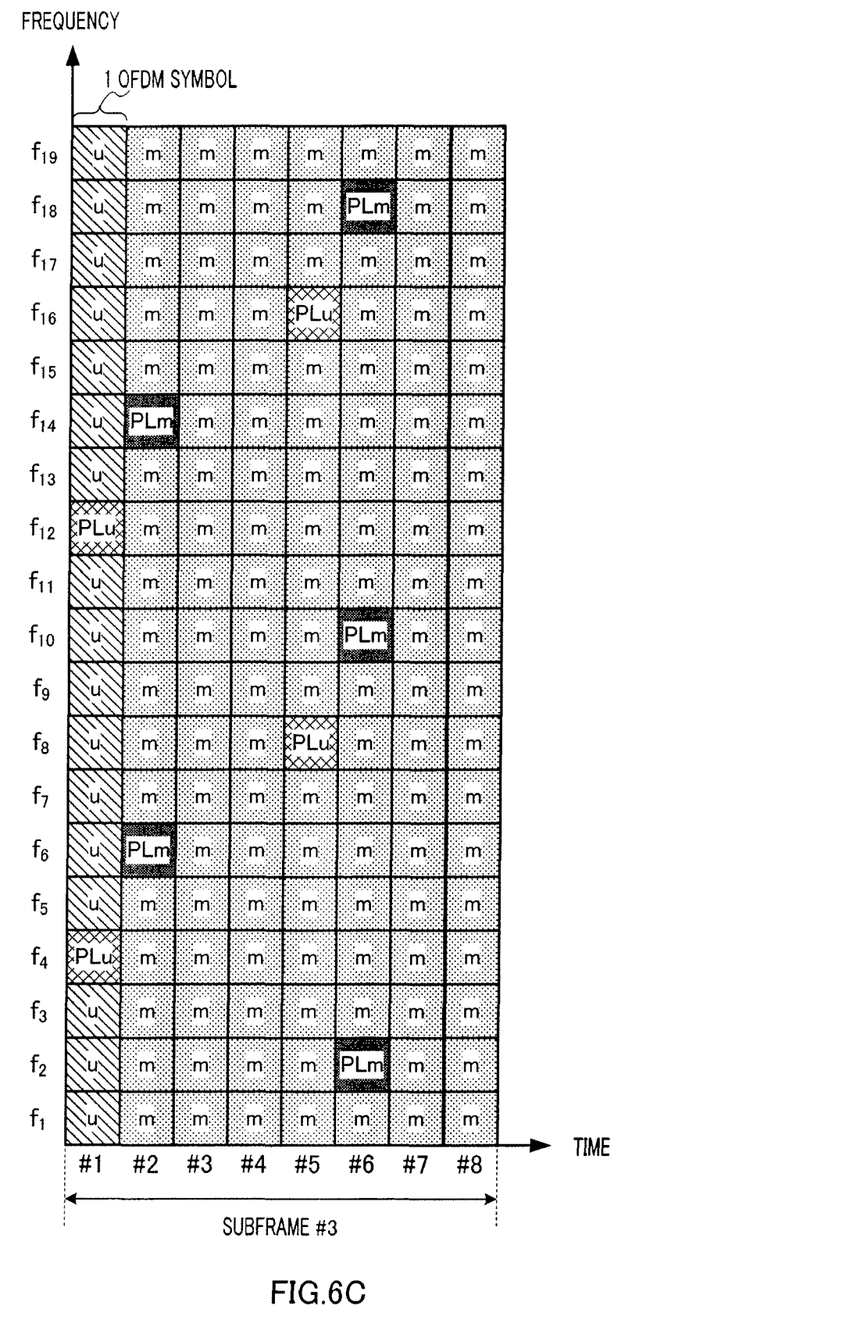
FIG. 6C illustrates a mapping example 5 (subframe #3)

MAPPING EXAMPLE 5 FIGS. 6A to 6C

In the present mapping example, out of a plurality of subcarriers forming a multicast OFDM symbol, multicast data pilots are mapped on subcarriers in the same frequencies every time, and, out of a plurality of subcarriers forming a unicast OFDM symbol, unicast data pilots are mapped on subcarriers in different frequencies from the subcarriers on which the pilots multicast data pilots are mapped in the multicast OFDM symbol, and the subcarriers on which unicast data are mapped are changed over time.

FIGS. 6A, 6B and 6C illustrate mapping examples in subframes #1, #2 and #3, respectively. Further, generally, one frame is comprised of twenty subframes #1 to #20.

In the present mapping example, the mapping positions for multicast data pilots are the same in all subframes. That is, out of a plurality of subcarriers forming a multicast OFDM symbol, multicast data pilots are mapped on subcarriers in the same frequencies every time. For example, as shown in FIGS. 6A to 6C, multicast data pilots ($PL_m$) are mapped on subcarriers $f_6$ and $f_{14}$ in multicast OFDM symbol #2 in all of subframes #1 to #3.

Further, when multicast data pilots ($PL_m$) are mapped as above, in subframe #1, as shown in FIG. 6A, out of a plurality of subcarriers $f_1$ to $f_{19}$ forming unicast OFDM symbol #1, unicast data pilots ($PL_u$) are mapped on subcarriers $f_2$, $f_{10}$ and $f_{18}$ in different frequencies from subcarriers $f_6$ and $f_{14}$ on which multicast data pilots are mapped in multicast OFDM symbol #2. Similarly, in subframe #2, as shown in FIG. 6B, unicast data pilots ($PL_u$) are mapped on subcarriers $f_8$ and $f_{16}$ in unicast OFDM symbol #1. In subframe #3, as shown in FIG. 6C, unicast data pilots ($PL_u$) are mapped on subcarriers $f_4$ and $f_{12}$ in unicast OFDM symbol #1.

As described above, in a case where mapping positions for multicast data pilots are the same in all subframes, in the frequency domain, by mapping unicast data pilots on subcarriers in different frequencies from subcarriers on which multicast data pilots are mapped, it is possible to prevent the multicast data pilots from interference by the unicast data pilots. Therefore, in all subframes, it is possible to prevent degradation of accuracy in channel estimation for multicast data due to interference from the unicast data pilots.

Further, in the present mapping example, subcarriers on which unicast data pilots varies every subframe, so that it is possible to improve the accuracy in interpolation for a channel estimation value for unicast data, in the frequency domain.

Further, for example, as shown in FIG. 6A, in subframe #1, in a case where multicast data pilots ($PL_m$) are mapped on subcarriers $f_2$, $f_{10}$ and $f_{18}$ in multicast OFDM symbol #6, to improve the accuracy in channel estimation for unicast data, unicast data pilots ($PL_u$) may be mapped on subcarriers $f_6$ and $f_{14}$ in multicast OFDM symbol #5. The same applies to subframes #2 and #3 (FIGS. 6B and 6C).

(Embodiment 2)

In a case where the OFDM scheme is used in multicast communication as above, a mobile station receives a combination of a plurality of the same multicast OFDM symbols transmitted from a plurality of base stations at the same time. Therefore, frequency selective fading of multicast data is more significant than that of unicast data. Therefore, in the frequency domain, more multicast data pilots are needed than unicast data pilots.

On the other hand, interference by multicast data does not occur between cells, and, consequently, the received SIR (Signal to Interference Ratio) of multicast data in a mobile station is higher than the received SIR of unicast data. Therefore, in a base station, it is possible to reduce transmission power for multicast data. The same applies between multicast data pilots and unicast data pilots.

Therefore, according to the present embodiment, more multicast data pilots are mapped in the frequency domain than unicast data pilots. Further, with the present embodiment, when the number of multicast data pilots mapped in the frequency domain becomes large, the transmission power of each pilot for multicast data becomes low.

Figure 7:
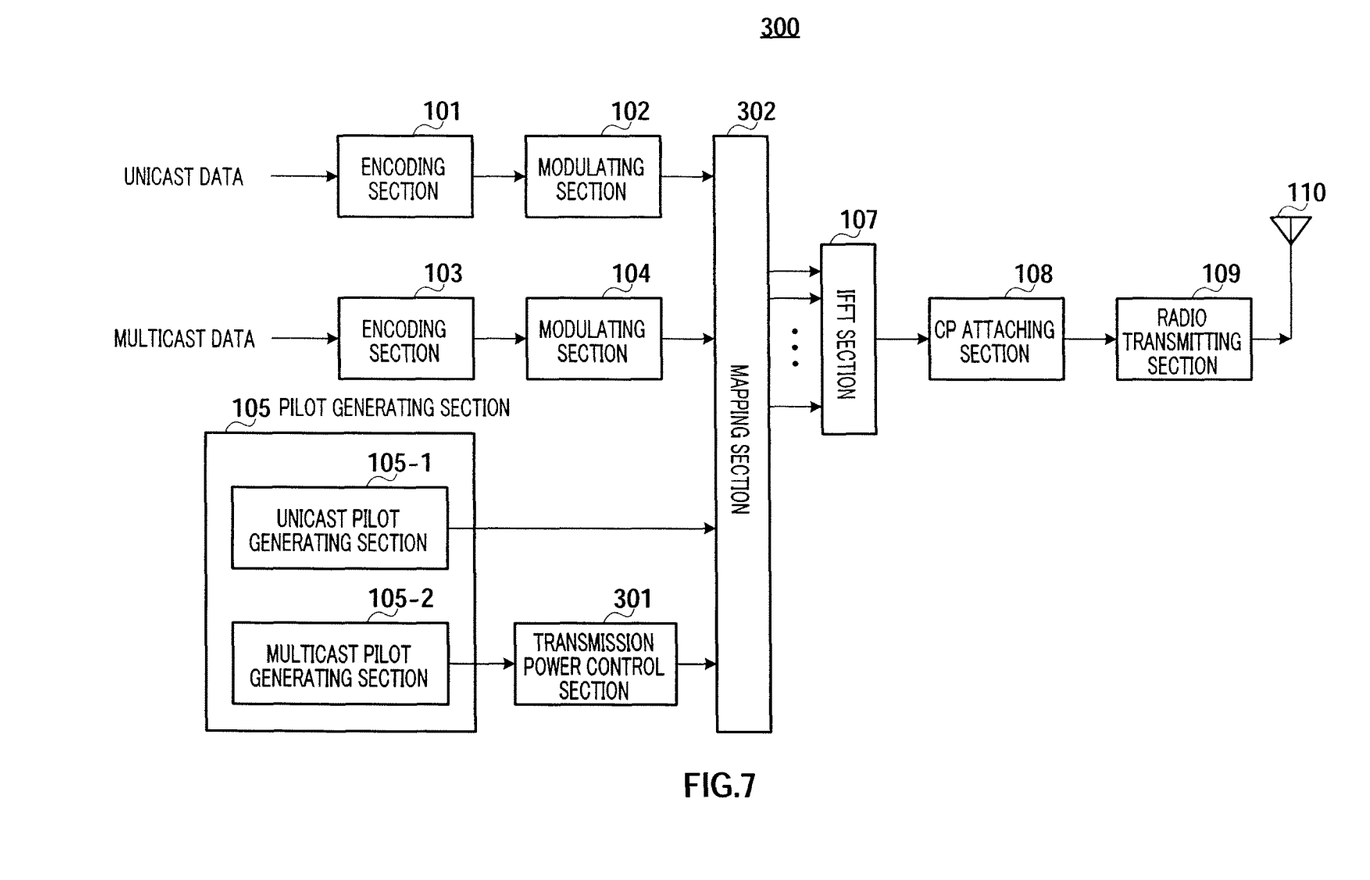
FIG. 7 is a block diagram showing a configuration of a base station according to Embodiment 2 of the present invention.

FIG. 7 illustrates a configuration of base station 300 according to the present embodiment. Further, in FIG. 7, the same components as in FIG. 1 (Embodiment 1) will be assigned the same reference numerals and explanations will be omitted.

Multicast pilot generating section 105-2 generates multicast data pilots and outputs them to transmission power control section 301.

Transmission power control section 301 controls transmission power for multicast data pilots and outputs the multicast data pilots after the transmission power control to mapping section 302. Transmission power control section 301 reduces the transmission power for multicast data pilots when the number of multicast data pilots mapped on a plurality of subcarriers forming a multicast OFDM symbol becomes large. For example, when five multicast data pilots are mapped on a plurality of subcarriers forming a multicast OFDM symbol, transmission power control section 301 controls the transmission power of each of the five multicast data pilots to a three-fifth of the transmission power in a case where three multicast data pilots are mapped.

Figure 8:
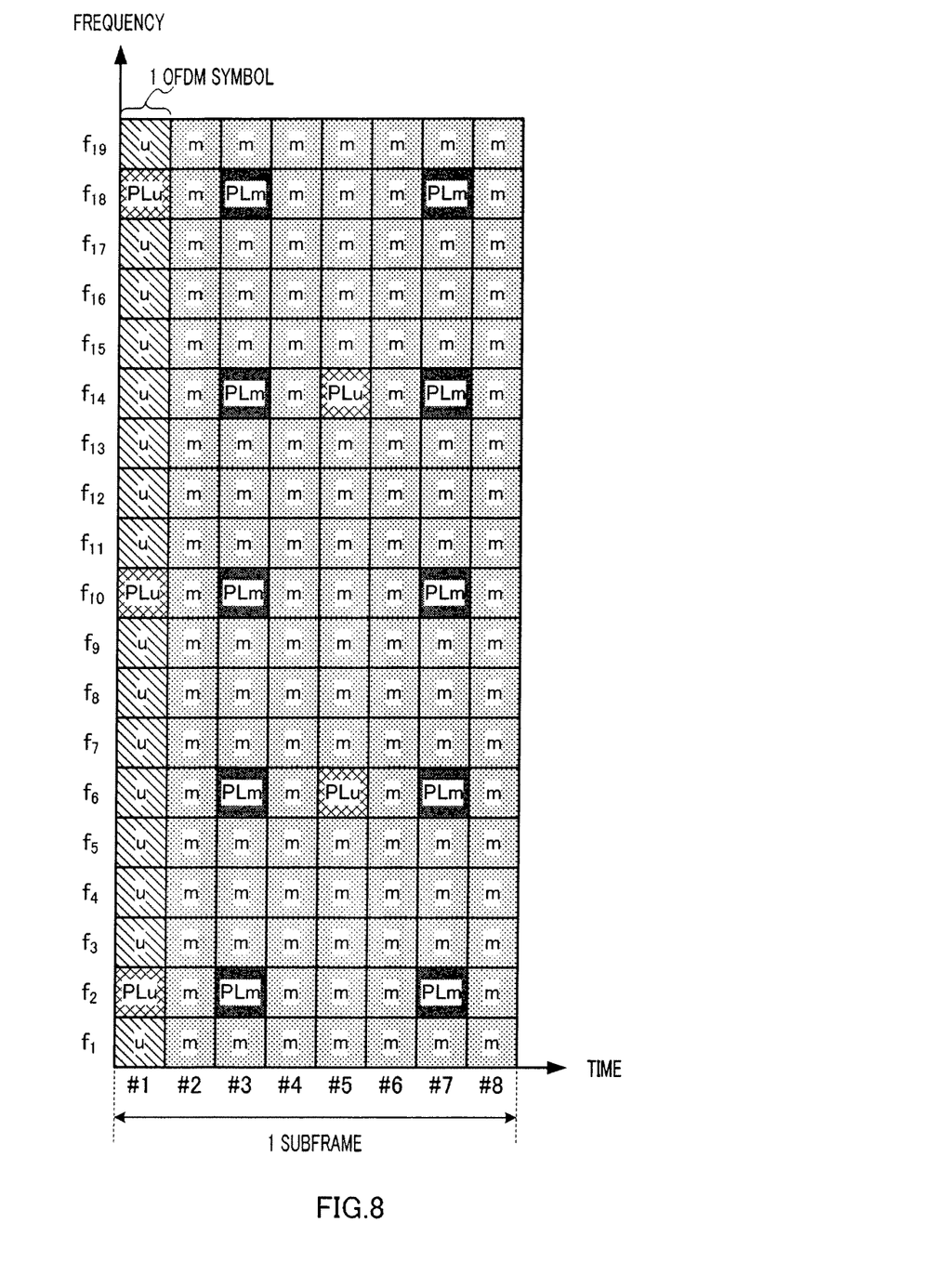
FIG. 8 illustrates a pilot mapping example 6.

As shown in FIG. 8, mapping section 302 maps more multicast data pilots ($PL_m$) on a plurality of subcarriers forming multicast OFDM symbol #2 than unicast data pilots ($PL_u$) mapped on a plurality of subcarriers forming unicast OFDM symbol #1. Further, although FIG. 8 shows a mapping example where the number of multicast data pilots increases from three to five based on mapping example 1 of Embodiment 1 (FIG. 2), the present embodiment can be implemented with any of mapping examples 1 to 5 of Embodiment 1.

As described above, according to the present embodiment, it is possible to improve the accuracy in channel estimation for multicast data without increasing the total transmission power for transmitting pilots.

Embodiments of the present invention have described above.

Further, by replacing "multicast" used in the above embodiments with "broadcast," it is possible to implement the present invention in the same way as above in a mobile communication system where broadcast data and unicast data are multiplexed. Further, by replacing "multicast" used in the above embodiments with "MBMS," it is possible to implement the present invention in the same way as above in a mobile communication system where MBMS data and unicast data are multiplexed.

Further, CP may be referred to as "GI," which means a guard interval. Further, a subcarrier may be referred to as a "tone."

Further, a base station and a mobile station may be referred to as "Node B" and "UE," respectively.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-075504, filed on Mar. 17, 2006, including the specification, drawings and abstract, is incorporated herein by reference in its entirety.

Industrial Applicability

The present invention is applicable to the mobile communication system or the like.

The invention claimed is:

1. A base station apparatus that transmits a multiplex signal having a first multicarrier signal and a second multicarrier signal multiplexed in a time domain, the base station apparatus comprising:
a generating section that generates a first pilot signal and a second pilot signal, the first pilot signal being different between a first plurality of cells, and the second pilot signal being the same between a second plurality of cells;
a mapping section that maps the first pilot signal and the second pilot signal in a two-dimensional plane representing a frequency domain and the time domain; and
a transmission power control section that sets a lower transmission power for the second pilot signals when the number of the second pilot signals mapped on the frequency domain becomes larger, wherein:
the mapping section maps the first pilot signal on a first subcarrier forming the first multicarrier signal, and maps the second pilot signal on a second subcarrier forming the second multicarrier signal, the second multicarrier signal not being adjacent to the first multicarrier signal in the time domain; and
the mapping section maps a greater number of the second pilot signals than a number of the first pilot signals in the frequency domain of one subframe, wherein:
out of a first plurality of subcarriers forming the second multicarrier signal, the mapping section:
maps the second pilot signal on the second subcarrier in a first frequency that is the same every time the second pilot signal is mapped, and,
out of a second plurality of subcarriers forming the first multicarrier signal, the mapping section:
maps the first pilot signal on the first subcarrier in a second frequency, the second frequency being different from the first frequency of the second subcarrier on which the second pilot signal is mapped in the second multicarrier signal, and
changes the first subcarrier on which the first pilot signal is mapped over time.

2. The base station apparatus according to claim 1, wherein, out of a plurality of subcarriers forming the second multicarrier signal, the second subcarrier on which the second pilot signal is mapped is in a frequency that is the same as a frequency of the first subcarrier on which the first pilot signal is mapped in the first multicarrier signal.

3. The base station apparatus according to claim 1, wherein,
the mapping section maps the first pilot signal on the first subcarrier forming the first multicarrier signal, and, out of a plurality of subcarriers forming the second multicarrier signal that is not adjacent to the first multicarrier signal in the time domain, maps the second pilot signal on the second subcarrier in a different frequency from the subcarrier on which the first pilot signal is mapped in the first multicarrier signal.

4. The base station apparatus according to claim 1, wherein,
out of a first plurality of subcarriers forming the second multicarrier signal, the mapping section maps the second pilot signal on the second subcarrier in the same frequency as a third subcarrier on which the second pilot signal is mapped in another base station apparatus of an adjacent cell, and, out of a second plurality of subcarriers forming the first multicarrier signal, maps the first pilot signal on the first subcarrier in a different frequency from the second subcarrier on which the second pilot signal is mapped in the second multicarrier signal.

5. The base station apparatus according to claim 1, wherein, for every subframe, the mapping section changes the first subcarrier on which the first pilot signal is mapped.

6. A base station apparatus that transmits a multiplex signal having a first multicarrier signal and a second multicarrier signal multiplexed in a time domain, the base station apparatus comprising:
a generating section that generates a first pilot signal and a second pilot signal, the first pilot signal being different between a first plurality of cells, and the second pilot signal being the same between a second plurality of cells; and
a mapping section that maps the first pilot signal and the second pilot signal in a two-dimensional plane representing a frequency domain and the time domain, wherein:

the mapping section maps the first pilot signal on a first subcarrier forming the first multicarrier signal and, out of a plurality of subcarriers forming the second multicarrier signal, maps the second pilot signal on a second subcarrier in a different frequency from the first subcarrier on which the first pilot signal is mapped in the first multicarrier signal, and the second multicarrier signal, including the second subcarrier on which the second pilot signal is mapped, is adjacent to the first multicarrier signal in the time domain, and out of the plurality of subcarriers forming the second multicarrier signal, the mapping section:

maps the second pilot signal on the second subcarrier in a first frequency that is the same every time the second pilot signal is mapped, out of another plurality of subcarriers forming the first multicarrier signal, maps the first pilot signal on the first subcarrier in a second frequency, the second frequency being different from the first frequency of the second subcarrier on which the second pilot signal is mapped in the second multicarrier signal, and changes the first subcarrier on which the first pilot signal is mapped over time.

7. The base station apparatus according to claim 6, wherein out of the plurality of subcarriers forming the second multicarrier signal, the mapping section maps the second pilot signal on the second subcarrier in the same frequency as a third subcarrier on which the second pilot signal is mapped in another base station apparatus of an adjacent cell, and, out of another plurality of subcarriers forming the first multicarrier signal, maps the first pilot signal on the first subcarrier in a different frequency from the second subcarrier on which the second pilot signal is mapped in the second multicarrier signal.

8. The base station apparatus according to claim 6, wherein, for every subframe, the mapping section changes the first subcarrier on which the first pilot signal is mapped.

9. A pilot signal mapping method performed by a base station apparatus that transmits a multiplex signal having a first multicarrier signal and a second multicarrier signal multiplexed in a time domain, the method comprising:

mapping a first pilot signal, that is different between a first plurality of cells, on a first subcarrier forming the first multicarrier signal, mapping a second pilot signal, that is the same between a second plurality of cells, on a second subcarrier forming the second multicarrier signal, the second multicarrier signal not being adjacent to the first multicarrier signal in the time domain, the first pilot signal and the second pilot signal being mapped in a two-dimensional plane representing a frequency domain and the time domain, setting a lower transmission power for the second pilot signals when the number of the second pilot signals mapped on the frequency domain becomes larger, and mapping a greater number of the second pilot signals than a number of the first pilot signals in the frequency domain of one subframe, wherein:

out of a first plurality of subcarriers forming the second multicarrier signal, mapping is performed to:

map the second pilot signal on the second subcarrier in a first frequency that is the same every time the second pilot signal is mapped, and, out of a second plurality of subcarriers forming the first multicarrier signal, mapping is performed to:

map the first pilot signal on the first subcarrier in a second frequency, the second frequency being different from the first frequency of the second subcarrier on which the second pilot signal is mapped in the second multicarrier signal, and change the first subcarrier on which the first pilot signal is mapped over time.

10. A pilot signal mapping method performed by a base station apparatus that transmits a multiplex signal having a first multicarrier signal and a second multicarrier signal multiplexed in a time domain, the method comprising:

mapping a first pilot signal, that is different between a first plurality of cells, on a first subcarrier forming the first multicarrier signal, and out of a plurality of subcarriers forming the second multicarrier signal, mapping a second pilot signal, that is the same between a second plurality of cells, on a second subcarrier in a first frequency that is different from a second frequency of the first subcarrier on which the first pilot signal is mapped in the first multicarrier signal, the first pilot signal and the second pilot signal being mapped in a two-dimensional plane representing a frequency domain and the time domain, wherein the second multicarrier signal, including the second subcarrier on which the second pilot signal is mapped, is adjacent to the first multicarrier signal in the time domain, and out of the plurality of subcarriers forming the second multicarrier signal, mapping the second pilot signal on the second subcarrier in a first frequency that is the same every time the second pilot signal is mapped, out of another plurality of subcarriers forming the first multicarrier signal, mapping the first pilot signal on the first subcarrier in a second frequency, the second frequency being different from the first frequency of the second subcarrier on which the second pilot signal is mapped in the second multicarrier signal, and changing the first subcarrier on which the first pilot signal is mapped over time.

* * * * *